May 5, 1959
C. A. BELSTERLING
2,885,618
MOTOR CONTROL SYSTEM
Filed Feb. 7, 1957
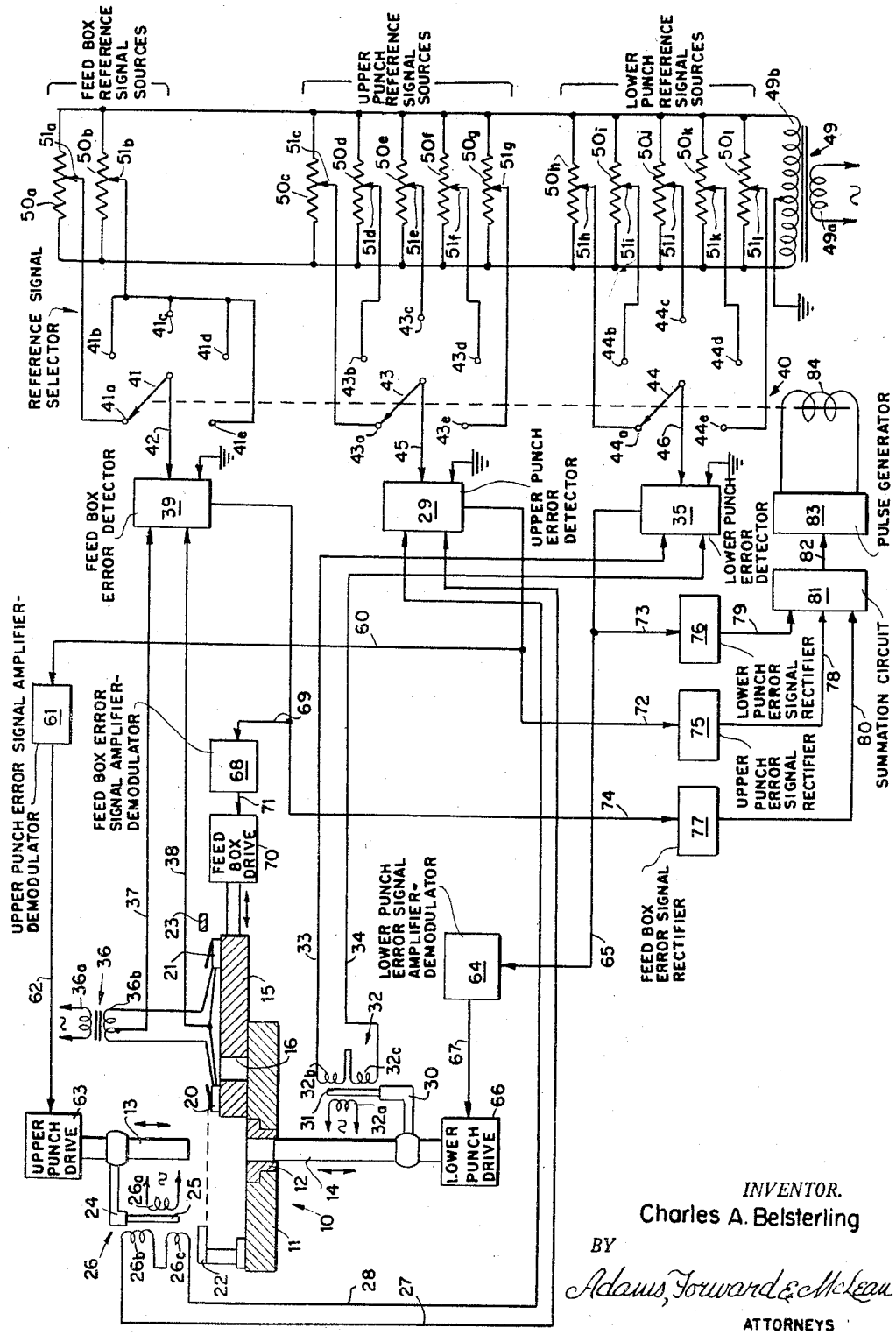
INVENTOR.
Charles A. Belsterling
BY
Adams, Forward & McLean
ATTORNEYS

United States Patent Office 2,885,618
Patented May 5, 1959

2,885,618

MOTOR CONTROL SYSTEM

Charles A. Belsterling, Lansdale, Pa., assignor, by direct and mesne assignments, to F. J. Stokes Corporation, Philadelphia, Pa., a corporation of Pennsylvania Application February 7, 1957, Serial No. 638,758

2 Claims. (Cl. 318—162)

My invention relates to automatic control systems and in particular provides a control system for machines, such as presses and the like, having a plurality of elements each of which is required to operate through a sequence of positions in coordination with the positions of other elements.

In punch presses, molding presses and the like wherein several disconnected members are required to operate in an interdependently timed sequence, it is frequently necessary to relate operation of such devices through a common control system, such as cam drive or a mechanical linkage, in order to assure positive interrelationship of their operation. The complexity of such mechanical relationship renders difficult the adjustment of the operation of a single member in order to accommodate an altered mode of operation since frequently such adjustment affects operation of all of the members which are connected to the particular operating sequence.

It is a particular object of my invention to provide an electrical control system employing servo controls for a plurality of mechanical elements which, although otherwise disconnected, are required to move in a sequence of positions in interdependently timed relationship.

It is thus an important object of my invention to provide electrical sequencing for controlling a plurality of servo mechanisms which will assure at each position of the sequence completion of operation of all the mechanisms controlled prior to initiation of the next succeeding position of the sequence.

These and other objects of my invention are generally obtained utilizing a plurality of servo mechanisms in which summation of the absolute values of the output error signals of the various error detecting devices is utilized to control a common sequencing switch to select the reference potentials for each error detecting device such that the common sequencing switch operates to a new position only when such summation of errors becomes zero or some other predetermined level.

For a more complete understanding of the principles of my invention reference is made to the accompanying drawing which in somewhat diagrammatic form illustrates a tablet press controlled by the system of my invention.

In the drawing it will be observed that a tablet press 10 including a die table 11 containing a vertically apertured die 12 is equipped with an upper punch 13, lower punch 14 and a feed box 15. In tablet press 10, it is desired that lower punch 14 should be able to move vertically to any desired positions ranging from that in which the upper tip of lower punch 14 is just bottomed in the vertical bore in die 12 to a position in which the tip of lower punch 14 is flush with the upper surface of die table 11. Similarly upper punch 13 should be able to move vertically from a position with its lower tip penetrating the bore of die 12 to a raised position with its lower tip above the upper surface of feed box 15. Feed box 15, which suitably is provided with a feed pocket 16, for carrying a charge of loose material to be tabletted to the bore in die 12 is designed for operation horizontally across the upper surface of die table 11 from a position retracted from the path of travel of upper punch 13 to a position aligning pocket 16 with the bore in die 12.

Press 10 is provided with suitable positioned sensing devices to indicate the various positions of punches 13 and 14 and feed box 15. Thus there is mounted on feed box 15 a pair of micro switches 20 and 21. A stop 22 is mounted on die table 11 to trip switch 20 when feed pocket 16 registers with the bore of die 12, and a stop 23 is similarly mounted in fixed position to trip switch 21 when feed box 15 is withdrawn from the line of travel of upper punch 13.

Upper punch 13 carries an offset arm 24 having a ferromagnetic tip 25 which is mounted to move vertically as a core through a differential transformer 26, the primary coil 26a of which is suitably supplied with 1000 cycle alternating current and the secondary coils 26b and 26c of which are connected in 180° phase opposition and are connected by lines 27 and 28 to upper punch error detector 29 to supply it with an input position signal which in phase and magnitude is a function of the vertical position of upper punch 13 with reference to some fixed horizontal plane.

Lower punch 14 is similarly provided with an arm 30 having a ferro-magnetic tip 31 which travels vertically as a core through a differential transformer 32 the primary winding 32a of which is connected to 1000 cycle alternating current and the secondary windings 32b and 32c of which are connected 180° out of phase and are connected by lines 33 and 34 to lower punch error detector 35 to supply it with an input position signal which in phase and magnitude is a function of the vertical position of lower punch 14 with reference to some fixed horizontal plane.

Micro switches 20 and 21 are connected in series across the secondary winding 36b of a suitable transformer 36, the primary winding 36a of which is connected to 1000 cycle alternating current. A pair of leads 37 and 38, taken respectively from the center tap of secondary winding 36b of transformer 36 and from the common connection of micro switches 20 and 21, are connected to feed box error detector 39 thus supplying it with one of three input position signals, one being an A.C. signal corresponding to a position of feed box 15 over die 12, one of opposite phase when feed box 15 is withdrawn from the path of travel of punch 13 and a zero signal corresponding to intermediate positions of feed box 15.

Reference input signals are supplied to detectors 29, 35 and 39 by means of a ganged, three pole, five position rotary selector switch 40. Pole 41 of switch 40 is connected by lead 42 to feed box error detector 39. Similarly poles 43 and 44 of switch 40 are connected respectively by leads 45 and 46 to upper punch error detector 29 and to lower punch error detector 35, respectively. Twelve potentiometers 50a–59l, inclusive, are connected in parallel across the secondary winding 49b of a suitable transformer 49, the primary winding 49a of which is connected to 1000 cycle alternating current. The secondary winding 49b of transformer 49 has its center tap grounded.

It will be observed that each pole 41, 43 and 44 sequentially is connected, one at a time, with each of a series of five contacts 41a–41e, 43a–43e and 44a–44e, respectively. The output taps 51a–51l, inclusive, of potentiometers 50a–50l, respectively, are connected to the contacts such that sliding tap 51a is connected only to contact 41a and that tap 51b is connected to each of contacts 41b, 41c, 41d and 41e. Sliding taps 51c–51g are respectively connected to contacts 43a–43e, and sliding taps 51h–51l are respectively connected to contacts 44a–44e. In this manner selector switch 40 as it rotates through its sequence of five positions feeds independently adjustable reference signals as inputs to each of error detectors 29, 35 and 39. Each such reference signal can be varied as desired with each change of selector 40 except in the case of the feed box reference signals, of which only two are required since feed box 15 has only two set positions. The reference signals thus supplied to error detectors 29, 35 and 39 can, by means of variable taps 51a–51l be set to any of a range of values of alternating current varying both in magnitude and phase, as desired.

Error detector 29 has, therefore, an alternating current output signal the magnitude and phase of which are a function of the difference between the position input signal from lines 27 and 28 and the reference input signal introduced from pole 43 through line 45. This alternating current error signal output is connected as indicated by line 60 to upper punch error signal amplifier demodulator 61, and the output of amplifier 61 is connected, as indicated by the line 62, to operate the drive mechanism 63 (error corrector) for upper punch 13. Suitably drive mechanism 63 is of the type disclosed in co-pending application, Serial No. 638,760 of Raymond G. Frank, filed of even date herewith. It can, however, take any of the conventional constructions including hydraulic movements and the like.

Lower punch error detector 35 similarly compares the phase and magnitude of the position input signal from lines 33 and 34 with the input reference signal selected by pole 44 and develops an output alternating current error signal the phase and magnitude of which are a function of the difference of the input signals. The alternating current output error signal from lower punch error detector 35 is connected to an amplifier demodulator 64 as indicated by the line 65. The amplified output of amplifier 64 is used to control operation of the drive mechanism 66 (error corrector) for lower punch 14 as indicated by the line 67. Drive mechanism 66, like drive mechanism 63 can be that of the aforenoted co-pending application of Raymond G. Frank, or it can similarly be of other suitable construction.

Feed box error detector 39 similarly compares in phase and magnitude the position input signal from lines 37 and 38 with the reference input signal selected by pole 41, and thus has an alternating current output error signal which varies in phase and magnitude as a function of the difference between such input signals. The output signal of error detector 39 is connected to an amplifier demodulator 68 by line 69, and the amplified output of amplifier 68 is employed to control feed box drive 70 (error corrector) as indicated by line 71.

Each of the output error signals from error detectors 29, 35 and 39 are also connected respectively by lines 72, 73, and 74 to separate error signal rectifiers designated as 75, 76 and 77 respectively. The D.C. outputs of rectifiers 75, 76 and 77 are respectively connected, as indicated by lines 78, 79 and 80, to a summation circuit designated by the reference numeral 81. In this manner the sum of the absolute values of the output error signals of detectors 29, 35 and 39 is taken. This summation output from circuit 81 is connected as indicated by line 82 to a pulse generator 83, the output of which is connected to a solenoid coil 84 the armature of which is connected to ganged poles 41, 43 and 44, such that upon each energization of coil 84, each of poles 41, 43 and 44 moves to its next associated contact. Thus if poles 41, 43 and 44 are respectively connected to contacts 41a, 43a and 44a a pulse from generator 83 causes solenoid 84 to move poles 41, 43 and 44 to connect respectively with contacts 41b, 43b and 44b.

A typical sequence of operation of press 10 includes a first (feed) position in which feed box 15 is moved into the press with pocket 16 aligned with the bore in die 12 and in which lower punch 14 is dropped to a preselected position such that the space above it in the bore of die 12 will retain a volume of loose material to be tabletted which is calculated to yield the correct size of tabletted product. At the same time upper punch 13 should be withdrawn to a position above the path of travel of feed box 15. In order to set these positions up, tab 51a is moved to a position producing a reference signal corresponding in phase and magnitude exactly to the position signal on lines 37 and 38 when micro switch 20 is closed. Tap 51c is similarly adjusted to draw an output signal corresponding to the output signal from differential transformer 26 at the desired raised position of upper punch 13. Similarly tap 51h is set to draw an output signal corresponding to the output signal of differential transformer 32 when lower punch 14 is in the lowered, feed position.

The second position in the sequence of operation requires only movement of feed box 15 out of the press and clear of the potential path of travel of upper punch 13. Accordingly tap 51b is set to deliver an output signal corresponding to the output signal on lines 37 and 38 when micro switch 21 is closed. Taps 51d and 51i are adjusted to yield same outputs as 51c and 51h respectively, since no movement of either upper punch 13 or lower punch 14 is desired until feed box 15 clears the press.

The third position in a typical sequence of operation involves lowering upper punch 13 into the bore of die 12. Accordingly, tap 51e is set to produce a reference signal corresponding to the output of differential transformer 26 when upper punch 13 is in the desired lowered position. Tap 51j is set to yield the same output as taps 51h and 51i.

In the fourth (compression) position both punches are moved together to compress the material in the bore of die 12 to its final tabletted form. Thus taps 51f and 51k are set to yield output signals corresponding to the outputs of differential transformers 26 and 32 when punches 13 and 14 are in the precise positions yielding the compressed tabletted product.

Finally in the fifth (eject) position it is necessary to raise upper punch 13 from die 12 and raise lower punch 14 flush with die table 11 to eject the tabletted product. Accordingly potentiometer taps 51g and 51l are set to produce signals corresponding to the outputs of differential transformers 26 and 32, respectively, when punches 13 and 14 assume such positions.

In operation, commencing with selector 40 in the eject (fifth) position at which poles 41, 43 and 44 contact respectively contacts 41e, 43e and 44e, pocket 16 is preloaded with tabletting material in the conventional manner. The control system is then turned on and since lower punch 14 is raised flush with die table 11, upper punch 13 is fully withdrawn and feed box 15 is fully withdrawn, the error signals developed by each of detectors 29, 35 and 39 should be zero with the consequent result that the outputs of rectifiers 75, 76 and 77 are also zero. The output of summation circuit 81 is, therefore, zero, and consequently generator 83 delivers a pulse to solenoid 84 rotating each of poles 41, 43 and 44 to the next (feed) position in which they connect with contacts 41a, 43a and 44a, respectively.

Since the setting of potentiometer tap 51c yields the same output signal as tap 51g, error detector 29 has a zero output signal and punch 13 does not move. The change from potentiometer tap 51l to 51h, however, produces an error signal at detector 35 which when amplified by amplifier demodulator 64 causes lower punch drive 66 to drop lower punch 14 to the feed position. Similarly the change from tap 51b to tap 51a produces an error signal output at detector 39 which when amplified at amplifier demodulator 68 causes drive mechanism 70 to correct the position of feed box by moving it into press 10.

When the output error signals from detectors 35 and 39 are reduced to zero indicating lower punch 14 and feed box 15 have assumed their desired positions, the summation of absolute values of these error signals again drops to zero, and, accordingly, pulse generator 83 again pulses solenoid 84 to move poles 41, 43 and 44 to the next successive position contacting respectively contacts 41b, 43b and 44b.

The new reference signals thus introduced create an error signal only in the output of detector 39. Accordingly feed box 15 is withdrawn from press 10 and as switch 21 is tripped by stop 23 this error signal becomes zero and the summation of errors again becomes zero. Selector 40 is then moved by the pulsed energization of solenoid 84 to the third position.

It will be apparent that as the sequence of operation continues, each new position of selector 40 causes one or more of detectors 29, 35 and 39 to respond to a difference between the reference signal applied through its associated section of selector switch 40 and the position signal supplied by its associated position sensitive device. Accordingly the errors are amplified and utilized to drive the various elements of press 10 in a manner correcting the noted errors until the error signals from all detectors again become zero at which point the summation of the absolute values of such error signals again equals zero and selector 40 is moved to the next position in the sequence of operation to deliver new reference potentials to the various detectors.

While I have described generally the operation of the control system of my invention with respect to a particular mode of operation for a specific press it will be evident that my control system can be employed not only with a variety of other machines, but also with other arrangements for position sensing of the elements of such machines and for developing reference signals. It will also be apparent that in addition to the advantages already described, the control system of my invention can be modified to include many additional features. Timing devices can be incorporated, for example where required in molding presses, which introduce an artificial error signal to the summation circuit whenever it is desired to hold the machine in a set position for a period of time. Similarly timing circuits can be employed which stop the machine if the summation of absolute values of the errors is not completed within a specified time.

This latter feature may be desired in order to detect over-shots which prevent proper closure of punches for example. Any arbitrary interlock signals can be applied at any desired time, either manually or automatically, for emergency stop, single cycle operation, and mechanical tool set up.

This control scheme makes a machine automatic as well as continuously self-gaging. The tolerance of the parts produced can be predetermined by choice of the error level at which the pulse generator 83 delivers a pulse.

I claim:

1. In a control system for devices having a plurality of elements required to move through a coordinated sequence of positions, the improvement which comprises position sensing means responsive to the positions of said elements having a plurality of position signals each of which is a function of the position of one of said elements, reference means having a plurality of separately selectable reference signals, a plurality of error detecting means, one said position signal being connected to each of said error detecting means as one input thereto, sequence selector means connecting as a second input to each said error detecting means a sequence of said separately selectable reference signals, each said error detecting means having an output signal which is a function of the difference between said pair of input signals, drive means responsive to the output signals of said error detecting means for operating each of said elements to diminish the output error signal associated therewith, and summation means responsive to the sum of the absolute values of said output signals connected to drive said sequence selector means to another selection of reference signals when said sum is some preselected level.

2. The improvement of claim 1 in which said output error signals are alternating current signals.

References Cited in the file of this patent

UNITED STATES PATENTS

| | | |
|---|---|---|
| 2,564,284 | Schurr | Aug. 14, 1951 |
| 2,801,692 | Wright | Aug. 6, 1957 |